May 28, 1929.  L. G. GATES  1,714,773
LUBRICATING APPARATUS
Filed Sept. 1, 1927
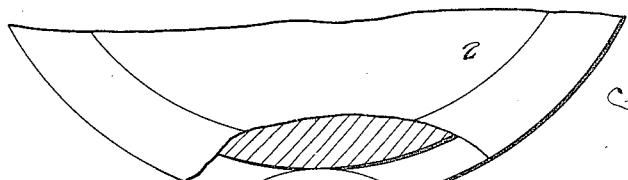
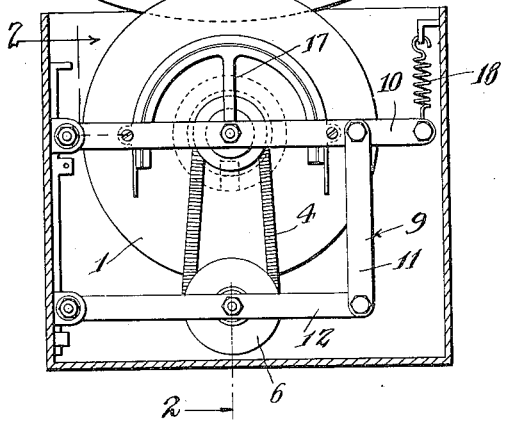
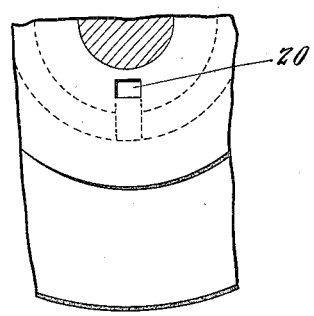
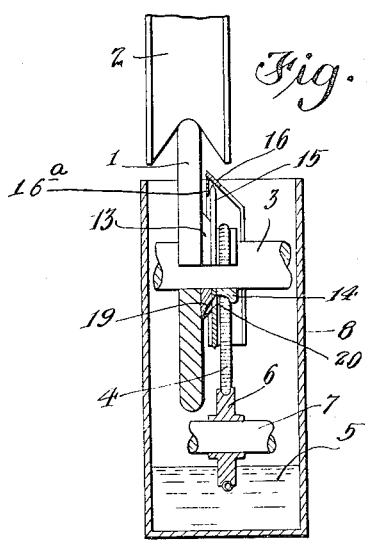
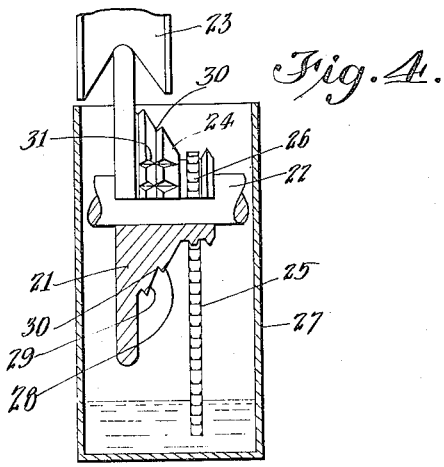
Inventor
Leroy G. Gates
By Lyon & Lyon
Attorneys Patented May 28, 1929.

1,714,773

UNITED STATES PATENT OFFICE.

LEROY G. GATES, OF BAKERSFIELD, CALIFORNIA, ASSIGNOR TO STANDARD OIL COMPANY OF CALIFORNIA, OF SAN FRANCISCO, CALIFORNIA, A CORPORATION OF DELAWARE.

LUBRICATING APPARATUS.

Application filed September 1, 1927. Serial No. 216,813.

This invention relates to apparatus for lubricating wire ropes or cables such as used in hoisting mechanisms. The present application contains subject matter which is a continuation in part of my application entitled "Apparatus for lubricating wire cables", Serial No. 87,037, filed February 9, 1926, now granted to me as Patent Number 1,665,451, dated April 10, 1928.

These devices are operated by the sheave carrying the cable which moves at a high speed. By reason of the high speed of the sheave, the lubricating apparatus must have special features of construction that enable it to apply only a small quantity of lubricant, and prevent the supplying of too great a quantity of the lubricant.

My former application discloses different specific means for applying such small quantities of lubricant to wire ropes or cables, and one of these means forms the subject matter of the present application. The general object of the present invention is to provide simple means for raising small quantities of lubricant and feeding the same onto the face of the sheave carrying the wire rope or cable; this enables the face of the sheave to transfer the lubricant to the wire cable. The means for effecting the transfer of the lubricant involves a device operating on the centrifugal principle.

A further object is to provide means for regulating the supply of lubricant, and for automatically lubricating the bearings of the device.

Further objects of the invention will appear hereinafter.

The invention consists of the novel parts and combination of parts to be described hereinafter, all of which contribute to produce an efficient lubricating apparatus.

A preferred embodiment of the invention is described in the following specification, while the broad scope of the invention is pointed out in the appended claims.

In the drawings:

Figure 1 is a view showing the lower portion of a sheave or pulley in side elevation, the lower portion of the sheave being broken away and shown in section; this view shows a device embodying my invention in vertical section.

Figure 2 is a vertical section taken about on the line 2—2 of Figure 1 and further illustrating details of the device, certain parts being omitted and others broken away.

Fig. 3 is a fragmentary view showing a portion of the main shaft of the device in cross section and further illustrating a lubricant duct illustrated in Figures 1 and 2.

Figure 4 is a view similar to Figure 2 but showing another embodiment of the invention.

The present embodiment of the invention is particularly useful where the lubricant is a relatively heavy oil. As illustrated, I employ a dauber wheel 1, located in the plane of rotation of the sheave 2 with its edge in contact with the sheave 2, and between the runs of the cable that is to be lubricated. This dauber wheel is carried on a shaft 3 and is preferably located in a vertical plane directly below the axis of the drum or sheave 2.

Over the dauber wheel passes an endless chain or belt 4, the lower end of which dips into a bath 5 of lubricant. This belt may simply hang in the lubricant, but as illustrated in Figures 1 and 2, it may pass around a small guide pulley 6 mounted on a shaft 7 with the lower edge of the pulley dipping into the oil which is held in a casing 8.

The two shafts 3 and 7 are preferably supported in a small movable frame 9 having means for urging the same upwardly. This frame may be composed of two bars such as the bar 10 which support the shaft 3 and these bars are connected by links 11 with lower bars 12 which carry the shaft 7. The bars 10 and 12 are substantially parallel to each other and are pivotally mounted at the side wall of the casing or holder 8.

The dauber wheel 1 has a hub 13, the outer portion of which is formed into a pulley 14 which is in line with the pulley 6 so that the belt 4 can pass over these pulleys. This belt may be formed of a light coil spring, the spaces between the belt operating to take up the lubricant and carry it up over the shaft 3. The hub 13 is provided with suitable means for enabling the centrifugal force to move the lubricant on to the adjacent face of the dauber wheel. In the present instance, I provide the device with means for transferring lubricant to the bearing of the shaft 3, and for this purpose I provide a centrifugal disc 15 between the body of the hub 13 and the pulley 14.

The function of the centrifugal disc 15 is to intercept most of the lubricant that is raised by the belt 4, and return the same to the bath of oil in the reservoir. Most of the oil on the disc will be thrown down on its under side. In order to prevent oil from being thrown directly from the upper edge of the disc 15 I provide a guard 16 on its upper side which is curved or semi-circular in form, with its ends supported on the side bars 10 of the frame 9. This guard has a radial tongue or arm 17 (see Figure 1), which is in a substantially vertical position, and this tongue conducts lubricant down to the bearing of the shaft 3. The guard 16 is preferably disposed in an inclined position, that is to say, it is of conical form and provided with a flange 16ª on its outer edge, which forms an angular pocket in which the oil will be caught. Of course, some of this oil will drip down onto the coil 13 and eventually reach the dauber which then deposits it on the face of the sheave.

A spring 18 is provided for urging the frame 9 upwardly toward the sheave 2.

In order to regulate the quantity of lubricant that passes onto the face of the dauber wheel 1, I prefer to provide a lubricant duct or groove 19 on the face of the hub 13 with means for adjusting the opening into the groove. The hub 13 is substantially conical adjacent the dauber wheel and in this conical face the groove 19 is formed. The mouth of this groove may register more or less with an opening 20 cut in the disc 15. When the disc and opening register exactly with each other as illustrated in Figure 3, the maximum amount of lubricant will pass through and onto the face of the dauber wheel. If desired, the disc 15 may be rotated through a small angle so as to close partially the opening 20. This will adjust the effective area of this opening and supply a reduced amount of lubricant to the dauber wheel.

In the embodiment of the invention shown in Figure 4, I provide simpler means for feeding the lubricant onto the sheave. In this embodiment, the apparatus includes a wheel 21 which is attached to a shaft 22 so that its edge runs in the groove of a sheave 23 which carries the cable that is to be lubricated.

At one end of the hub 24 of the dauber wheel 21 is provided a continuous oil raising device which may be in the form of an endless chain 25 which hangs in a loop from a sprocket wheel 26 on the hub 24. The lower end of this chain hangs in a bath of lubricant held within the casing 27. The chain may be of the common type known as "open" chain or "ladder" chain. Between the chain and the wheel 21 I provide one or more centrifugal collars 28 which have inclined or conical faces 29 over which the lubricant travels in an outward direction with respect to the axis of the shaft 22 and toward the disc of the wheel 21. Between the collars a continuous groove 30 is formed which passes circumferentially around the hub. The collars have oil feed grooves 31 in the form of notches cut in their faces (see Figure 4). The oil that is not thrown off by the throw-off rings or collars 24 works into these grooves and passes onto the face of the disc of the pulley from which point it works outwardly under the influence of the centrifugal force and is eventually deposited at the bottom of the groove of the pulley or sheave 23.

It is understood that the embodiment of the invention described herein is only one of the many embodiments this invention may take, and I do not wish to be limited in the practice of the invention, nor in the claims, to the particular embodiment set forth.

What I claim is:

1. In apparatus for lubricating a wire rope passing around a drum or sheave, the combination of a wheel mounted to rotate, means for supporting the same in substantially the same plane as the sheave and with its edge against the face of the sheave, so that the wheel is rotated at a high speed, and means for supplying lubricant to the wheel, said wheel having means for receiving lubricant and means for directing the lubricant outwardly on the wheel by centrifugal action onto the face of the sheave.

2. In apparatus for lubricating a wire rope passing around a drum or sheave, the combination of a wheel, means for supporting the same to rotate in substantially the same plane as the sheave and in contact with the face of the sheave between the runs of the rope, a bath of lubricant, said wheel having a hub with means running over the same and dipping in the bath to supply lubricant continuously to the hub while the wheel is rotated by the sheave, said hub having centrifugal collars to throw off excess lubricant and having oil grooves for directing the lubricant onto the side of the wheel by the action of centrifugal force.

3. In a lubricating apparatus for conveying lubricant to a rotary part, the combination of a dauber wheel to engage the rotary part, a shaft for rotatably supporting the same, a holder for the lubricant, a pulley rotatably mounted adjacent the lubricant, and an endless chain or belt passing around the pulley and passing around the shaft of the dauber wheel, and means on the shaft between the chain and the dauber wheel for directing the lubricant by centrifugal force to the dauber wheel.

4. In a lubricating apparatus for conveying lubricant to the face of a sheave, the combination of a dauber wheel to engage the face of the sheave, a shaft for rotatably supporting the same, a holder for the lubricant, a pulley rotatably mounted adjacent the lubricant, an endless chain or belt passing around the pulley and passing around the shaft to the dauber wheel for conveying lubricant to the same, said dauber wheel having means operating under centrifugal action to conduct the lubricant to the face of the dauber wheel.

5. In a lubricating apparatus for conveying lubricant to a sheave, the combination of a dauber wheel to engage the sheave, a shaft for rotatably supporting the same, means for conveying lubricant to the hub of the pulley, said pulley having a disc operating under the action of centrifugal force to throw the lubricant toward the sheave, and a guard in the path of the lubricant thrown off from said disc having means for guiding the lubricant down to the bearing of said shaft.

6. In apparatus for conveying lubricant to the face of a rotating sheave, the combination of a movable frame, a dauber wheel rotatably mounted in the frame and having a hub, means for urging the movable frame toward the sheave to hold the dauber wheel in contact with the same, a pulley rotatably supported in the frame adjacent the lubricant, and a chain or belt passing around the hub and the pulley for conveying lubricant to the said hub, said dauber wheel having means operating under centrifugal action to convey the lubricant to the face of the dauber wheel.

7. In apparatus for conveying lubricant to the face of a rotating sheave, the combination of a dauber wheel to engage the sheave, said dauber wheel having a hub with a lubricant duct therein, a centrifugal disc having an opening which may register more or less with the mouth of the duct to regulate the opening through the duct, and means for supplying lubricant to the face of the disc adjacent the opening.

8. In apparatus for lubricating a wire rope passing around a drum or sheave, the combination of a rotating wheel, means for supporting the same to rotate in substantially the same plane as the sheave and with its edge adjacent to the face of the sheave between the runs of the cable, said wheel having a hub with means for feeding lubricant onto the hub, said hub having centrifugal collars operating under the action of the centrifugal force to advance and throw off excess lubricant and having oil grooves for directing the lubricant onto the face of the wheel.

9. In lubricating apparatus, the combination of a member with a lubricant duct for conveying lubricant toward the part to be lubricated, centrifugal means for advancing the lubricant through the duct and means for regulating the effective area of the duct.

Signed at Bakersfield this 12th day of Aug., 1927.

LEROY G. GATES.